(12) United States Patent
Gilmartin et al.

(10) Patent No.: US 11,457,768 B1
(45) Date of Patent: Oct. 4, 2022

(54) INDOOR SMOKELESS GRILL AND AIR FRYER COMBINATION DEVICE

(71) Applicant: HPC Brands, LLC, Middleton, WI (US)

(72) Inventors: Jane Gilmartin, Fairfield, NJ (US); James Mitrik, Fairfield, NJ (US); Paul McGrath, Fairfield, NJ (US); Alejandro G. Lozano, Fairfield, NJ (US)

(73) Assignee: HPC BRANDS, LLC, Middleton, WI (US)

( * ) Notice: Subject to any disclaimer, the term of this patent is extended or adjusted under 35 U.S.C. 154(b) by 0 days.

(21) Appl. No.: 17/508,329

(22) Filed: Oct. 22, 2021

(51) Int. Cl.
| | |
|---|---|
| *A47J 37/06* | (2006.01) |
| *A47J 27/00* | (2006.01) |
| *A47J 37/07* | (2006.01) |
| *A47J 37/01* | (2006.01) |
| *A47J 36/32* | (2006.01) |

(52) U.S. Cl.
CPC ......... *A47J 37/0641* (2013.01); *A47J 27/004* (2013.01); *A47J 36/32* (2013.01); *A47J 37/015* (2013.01); *A47J 37/0709* (2013.01); *A47J 37/0754* (2013.01); *A47J 37/0786* (2013.01); *A47J 37/0629* (2013.01)

(58) Field of Classification Search
CPC ................ A47J 31/0641; A47J 31/0629; A47J 31/0676; A47J 31/0754; A47J 37/0641; A47J 37/0629; A47J 37/0676; A47J 37/0754
USPC .................................................. 99/474, 476
See application file for complete search history.

(56) References Cited

U.S. PATENT DOCUMENTS

| | | | |
|---|---|---|---|
| 1,659,721 A | | 2/1928 | Chauncey |
| 3,749,000 A | | 7/1973 | Vidjak et al. |
| 3,859,505 A | | 1/1975 | Herbrand et al. |
| 4,020,322 A | | 4/1977 | Muse |
| 4,233,495 A | * | 11/1980 | Scoville ................ A47J 39/003 219/400 |
| 4,832,226 A | | 5/1989 | Leon |
| 4,889,972 A | * | 12/1989 | Chang ................. A47J 37/0629 219/472 |

(Continued)

FOREIGN PATENT DOCUMENTS

| | | |
|---|---|---|
| CN | 203234602 U | 10/2013 |
| CN | 110558830 A | 12/2019 |

(Continued)

*Primary Examiner* — Reginald Alexander
(74) *Attorney, Agent, or Firm* — Kagan Binder, PLLC

(57) ABSTRACT

The present technology provides a multi-purpose cooking apparatus that provides simultaneous smokeless grilling for food products and air frying for food products utilizing the same fan and heating elements. A lower portion of the apparatus includes an enclosed air fryer cooking chamber with a closable door. The air fryer cooking chamber is heated with heating elements and a fan for blowing heated air through the cooking chamber. The upper portion of the apparatus utilizes the same upper heating elements as the air fryer chamber and includes a grilling surface, such as a grilling plate, in an enclosed interior cooking environment. The fan pulls air from the upper portion, filters smoke from the air, and returns the air to the lower portion of the apparatus. The heated, smokeless, circulated air from the fan is used to air fry in the lower portion.

18 Claims, 20 Drawing Sheets

(56) References Cited

U.S. PATENT DOCUMENTS

| | | | |
|---|---|---|---|
| 6,111,226 A * | 8/2000 | Lee | F24C 7/04 |
| | | | 219/393 |
| 6,124,572 A | 9/2000 | Spilger et al. | |
| 6,418,835 B1 * | 7/2002 | Lin | A47J 37/0641 |
| | | | 219/400 |
| 6,657,167 B2 | 12/2003 | Loveless | |
| 8,025,007 B1 | 9/2011 | Boyer | |
| 8,950,319 B2 * | 2/2015 | Nam | A21B 1/26 |
| | | | 219/400 |
| 9,027,470 B1 * | 5/2015 | Magner | A47J 36/24 |
| | | | 99/474 |
| 10,337,745 B2 | 7/2019 | McKee et al. | |
| 10,765,257 B2 | 9/2020 | Chen et al. | |

FOREIGN PATENT DOCUMENTS

| | | |
|---|---|---|
| CN | 210354403 U | 4/2020 |
| CN | 211066237 U | 7/2020 |
| CN | 211130731 U | 7/2020 |
| CN | 211324472 U | 8/2020 |
| CN | 211748785 U | 10/2020 |
| CN | 213429696 U | 6/2021 |
| CN | 112168009 B | 11/2021 |
| CN | 215016285 U | 12/2021 |
| CN | 215077715 U | 12/2021 |
| CN | 215914235 U | 3/2022 |
| EP | 1431667 A2 | 6/2004 |
| EP | 3597086 A1 | 1/2020 |
| WO | 2010063992 A1 | 6/2010 |
| WO | 2015081549 A1 | 6/2015 |
| WO | 2020184785 A1 | 9/2020 |

\* cited by examiner

INDOOR SMOKELESS GRILL AND AIR FRYER COMBINATION DEVICE

FIELD OF INVENTION

The present invention relates to cooking devices. In greater particularity, the present invention relates to a cooking device that provides simultaneous smokeless grilling for food products and air frying for food products utilizing the same fan and heating elements.

BACKGROUND

Conventional electric grills typically are made of a lower heating element on which food items are placed. In certain conventional grills, a lid is closed over the food items to retain heat over the food item. The conventional electric grill typically has a pattern, such as grill stripes, cast into the cooking surface of the two elements to imprint the pattern onto the surface of the food item. The electric grill is typically heated by an internal heating element controlled by a temperature controller. Conventional air fryers have a heating element and a fan to force heated air to circulate around food products. These conventional cookers do not provide options to users for using a single device that provides smokeless grilling for food products and air frying for food products utilizing the same fan and heating elements.

SUMMARY OF THE INVENTION

The present technology provides a multi-purpose cooking apparatus that provides simultaneous smokeless grilling for food products and air frying for food products utilizing the same fan and heating elements. A lower portion of the apparatus includes an enclosed air fryer cooking chamber with a closable door. The air fryer cooking chamber is heated with heating elements and a fan for blowing heated air through the cooking chamber. The heated air, if of sufficient heat and velocity, will air fry foods in the air fryer cooking chamber. In an example, at least one set of the heating elements are in the top of the air fryer cooking chamber.

An electric grill portion of the apparatus utilizes the same upper heating elements as the air fryer chamber and includes a grilling surface, such as a grilling plate, in an enclosed interior cooking environment. The grilling surface may be in a grilling cooking chamber that is above the air fryer cooking chamber. The upper heating elements are positioned between the grilling surface and the top of the air fryer cooking chamber. The single set of upper heating elements simultaneously heat the air fryer chamber and the grilling surface. When a lid is enclosed on the grilling cooking chamber, the cooking environment contains any smoke generated from the cooking environment.

The fan that is used to circulate heated air in the air fryer cooking chamber is also used to draw air from the grilling cooking chamber through a filtering system to remove smoke from the air. The smoke from the cooking food item is drawn via negative pressure into the filtering system via one or more air inlet slits or openings in a sidewall of the cooking environment of the grilling cooking chamber. The smoke may be mitigated by one or more processes, such as by passing through the fan blades, passing through a filter, or passing over a bed of water. The air, after having some or all of the smoke removed, is returned to the air fryer chamber to continue cooking food products. The grilling plate includes channels and/or orifices that allow grease or other liquids to drain away from the food item. The grease may be channeled to a collection basin for removal.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

The drawings are appended hereto and form a portion of this disclosure.

DETAILED DESCRIPTION

Figure 1:
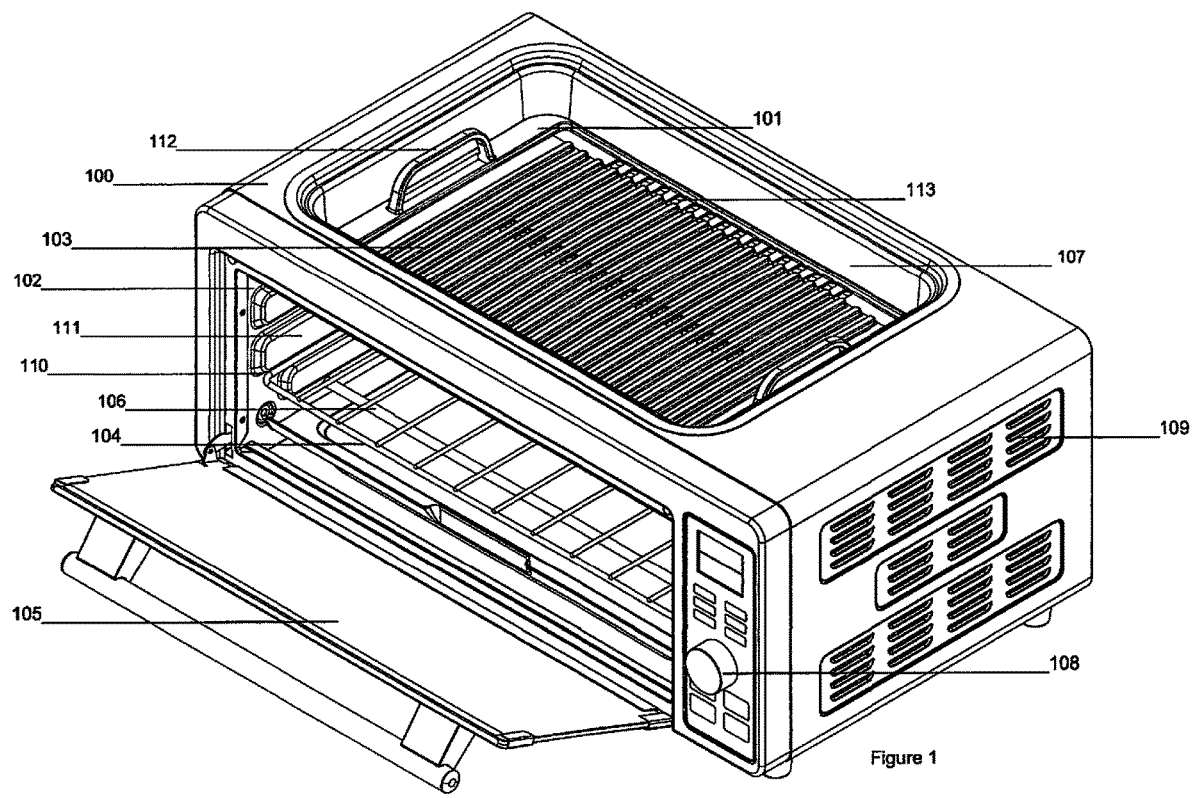
FIG. 1 is a perspective view of one embodiment of a two-tier grill with a lid removed and a door open.

The examples described herein provide a multi-purpose two-tier grill that provides simultaneous smokeless grilling for food products and air frying for food products utilizing the same fan and heating elements. The examples describe the two-tier grill and features that cause the heating elements and fan to be used in either or both of air frying or grilling mode, cause the smoke to be retained and reduced, and cause the grease from the food items to be directed away from the cooking environment.

Air frying is a method of cooking that uses circulated heated air to cook food more quickly and more evenly. As opposed to a traditional oven, the heated air is blown from a fan across the surface of the food products. As opposed to a conventional convection oven, an air fryer has a higher speed fan to blow the air, typically at least 30% higher than a convection oven. Air fryers also typically place the fan adjacent to the heating elements to allow the hotter air to be blown more efficiently. Air fryers typically employ a wire basket or other perforated food holder to allow the heated air to pass over all sides of the food product. The wire basket allows the food products to cook more quickly and evenly. Typically, food products are grilled by direct contact with a higher heat source, such as directly over a fire or a hot grilling plate. Baking uses lower-temperature, dry heat to cook food products. Air frying uses hotter circulated air to contact the food products and create a crispier coating. Because hot air is a poor conductor as compared to oil or grilling plates, the circulation of the air makes products crispier that food baked in a standard oven without the circulation. The two-tier grill described herein allows a user to grill items on the grilling plate, air fry products in the air fryer chamber, and bake items in the air frying chamber.

The grilling plate in the grilling cooking chamber may have ridges to create sear marks on the food items. The grilling plate may have any other type of structure to create sear marks, such as crosshatches, waffle patterns, or designs. The grilling plate, in certain examples, is removable or replaceable. For example, the grilling plate may be removed for cleaning.

The air inside the grilling chamber is drawn by the fan through inlet vents to the fan inlet in a sidewall of the grilling chamber. The two-tier grill may use any suitable smoke reduction system. In one example, a filter may be placed before or after the fan to remove the smoke. In another example, the turbulence created by a cross-flow fan causes the smoke particles to precipitate from the air. The cross-flow fan may be a type of fan that creates greater turbulence to remove a greater amount of smoke, such as an axial fan with a greater number of blades and/or with blades that are longer. In another example, a pan of water or other liquid may be placed in the channel or channel. When the smoke-filled air passes over the water, the smoke precipitates out of the passing air. Any other suitable mechanism or process may be used to remove the smoke from the air.

The air from the outlet of the fan is directed via outlet air vents inside the air fryer chamber. If products are being air fried, the heated forced air passes over and around the food items. The air passes out of the air fryer chamber to the grilling chamber via holes, vents, or other openings between the air fryer chamber and the grilling chamber. The air is then drawn by the fan out of the grilling chamber as described above. The air is thus recirculated through the two-tier grill to conserve the generated heat and to reduce smoke exhausted to the outside environment.

FIG. 1 is a perspective view of one embodiment of a two-tier grill 100 with a lid 301 removed and a door 105 open, in accordance with certain examples of the technology disclosed herein. The two-tier grill 100 is illustrated with a grilling chamber 101 as an upper tier on the two-tier grill 100 and an air fryer chamber 102 as a lower tier. In other examples, the grilling chamber 101 and the air fryer chamber 102 may be side by side or in any other suitable configuration.

The two-tier grill 100 is configurable to cook food items on a grilling plate 103. The lid (as illustrated at least in FIG. 3 as lid 301) may be raised to place food and cooking components inside the grilling chamber 101 of the two-tier grill 100 and/or to remove the food and components. The grilling plate 103 is illustrated with ridges to create sear marks on the food items. The grilling plate 103 may have any other type of structure to create sear marks, such as crosshatches, waffle patterns, or designs. The grilling plate 103, in certain examples, is removable or replaceable. For example, the grilling plate 103 may be removed for cleaning. The grilling plate 103 is constructed of a material, such as metal or ceramic, that conducts heat from the upper element 501 through to the food products that are placed on the grilling plate 103. The grilling plate 103 may have handles 112 or other means of removing or manipulating the grilling plate 103.

The grilling plate 103 has one or more grease drain holes, such as hole 113. The grilling plate 103 includes a channel, holes, or other feature to drain the grease or other liquids from the food to a holding reservoir. In addition to reducing the fat and calories in the food items, removing the grease from the cooking surface of the grilling plate 103 reduces the smoke created by the grilling plate 103 when cooking a food item. Heated grease creates more smoke and removing a portion of the grease reduces the smoke created.

The sidewall 107 around the grilling plate 103 create a perimeter wall around the food items. The sidewall 107 may be a solid wall that surrounds the removable grilling plate 103. The sidewall 107 may encircle the entire perimeter of the grilling plate 103 or may only encircle a portion of the grilling plate 103. The sidewall includes inlet vent holes (as illustrated at least in FIG. 5).

Figure 5:
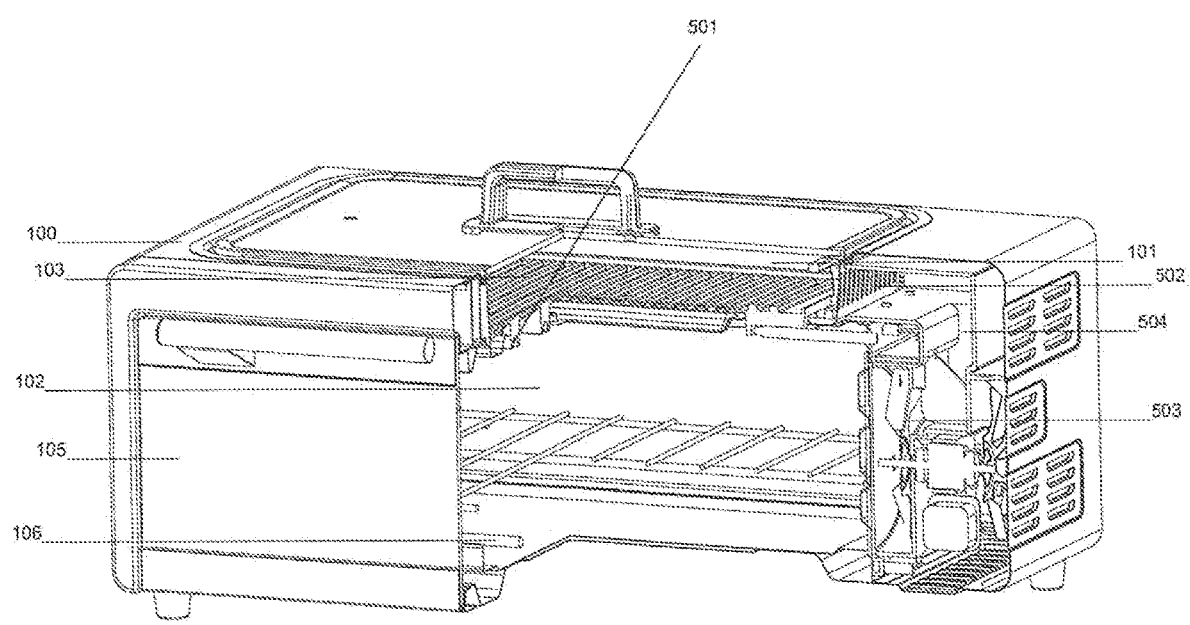
FIG. 5 is a cutaway view of one embodiment of a two-tier grill with a lid and a closed door.

The operations of the fan and the air circulation process is described in greater detail with respect to FIG. 5.

The air fryer chamber 102 is illustrated with a door 105. The door 105 may be affixed to the two-tier grill 100 by hinges or other connection mechanisms that allow the door 105 to open and close. The door 105 is illustrated as opening downward with bottom hinges to provide an opening to the air fryer chamber 102. Alternatively, the door 105 may open in any other manner, such as from the top or the side, or by having French doors that open from the middle.

The air fryer chamber 102 is illustrated with one or more environmental vents 109. The environmental vents 109 are on the outside wall of the body of the two-tier grill 100. The environmental vents 109 may be of any suitable size or configuration, such as slotted vents, open holes, or any other shape. The environmental vents 109 allow a secondary fan (not shown) to draw in environmental air to keep the body of the two-tier grill 100 and any electrical components or other components from over-heating. In one example, environmental vents 109 are not utilized as part of the cooking air circulation, but only for temperature maintenance on the body of the two-tier grill 100.

The air fryer chamber 102 is illustrated with a wire rack 104. The wire rack 104 may be used to hold food items, trays, baking pans, wire baskets, or any other cooking implement. Edges of the wire rack 104 are inserted by a user into grooves 110 on the walls of the air fryer chamber 102 to suspend the wire rack 104 at a desired height. The grooves 110 may be created by protrusions 111 into the walls of the air fryer chamber 102 or by indentions in the walls of the air fryer chamber 102. Two or more protrusions 111 are aligned in parallel and separated by a distance that allows the rack 104 to slide between an upper and a lower protrusion 111. The wire rack 104 slides into the grooves 110 between the protrusions 111 that are at the desired height. Any other type of mechanism may create the grooves 110, such as rollers, indentions, channels, or any other type of suitable mechanism.

A display or control panel 108 is illustrated with features such as temperature display, timer settings, temperature settings, quick start functions, preset cooking processes, or any other suitable controls. The controls may be buttons, toggles, switches, or other physical interface objects. The controls may be digital representations of interface objects. For example, the control panel 108 may be a touchscreen. The control panel 108 provides interface objects that allow a user to select between grilling, air frying, or both. The control panel 108 provides interface objects that allow a user to set the temperature, fan speed, cooking time, or any other selection. The control panel 108 provides interface objects that allow a user to control which heating elements are engaged or any other suitable settings.

The two-tier grill 100 has heating elements to heat the air inside the air fryer chamber 102, such as lower element 106. The lower element 106 may be any suitable type of electric resistive heating elements or any other type of element that produces heat from electricity. The lower elements 106 are both exposed to the air fryer chamber 102 and together or separately with an upper heating element. The upper heating element 501 disposed between the grilling chamber 101 and the air fryer chamber 102 are illustrated and described in greater detail with respect to at least FIG. 5 and FIG. 6. The elements 106 serve to heat the air fryer chamber 102. The elements 106 are controlled by the control panel 108 or any other suitable controller. The elements 106 may be engaged or disengaged to maintain a desired temperature in the air fryer chamber 102 and/or the grilling chamber 101. Alternatively or additionally, the control panel 108 or other controller increased or decreases the power supplied to the elements 106 to maintain a desired temperature in the air fryer chamber 102 and/or the grilling chamber 101

Figure 2:
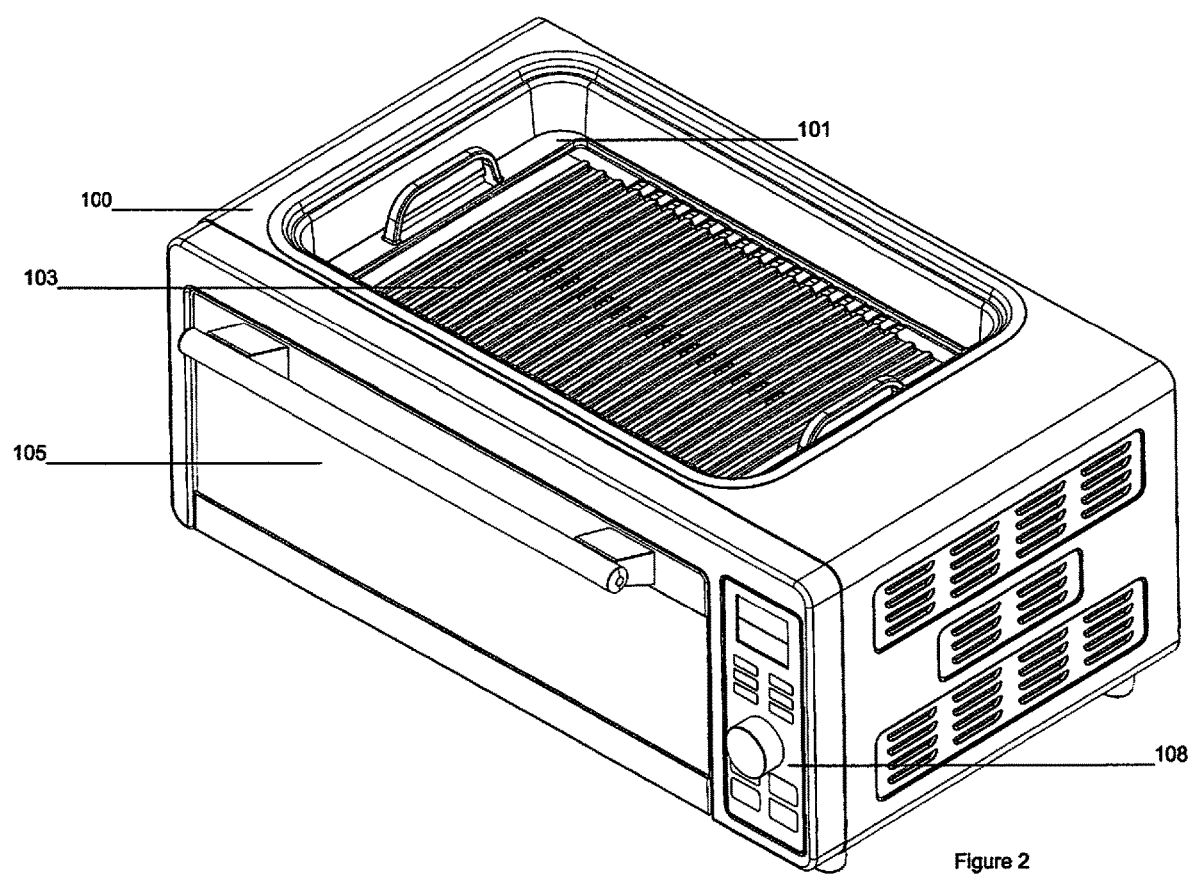
FIG. 2 is a perspective view of one embodiment of a two-tier grill with a lid removed and a closed door.

FIG. 2 is a perspective view of one embodiment of a two-tier grill 100 with a lid 301 removed and a closed door 105, in accordance with certain examples of the technology disclosed herein. The two-tier grill 100 is illustrated with at least the grilling chamber 101 without a lid, the closed door 105 to the air fryer chamber 102, the grilling plate 103, and the control panel 108. With the closed door 105, the temperature inside the air fryer chamber 102 is able to be heated to a desired temperature to air fry the food products inside or cook the food products in any other desired manner. The circulated heated air is further contained inside the two-tier grill 100 when the door is closed.

Without a lid 301 on the grilling chamber 101, a user can place food items onto the grilling plate 103 for cooking.

Figure 3:
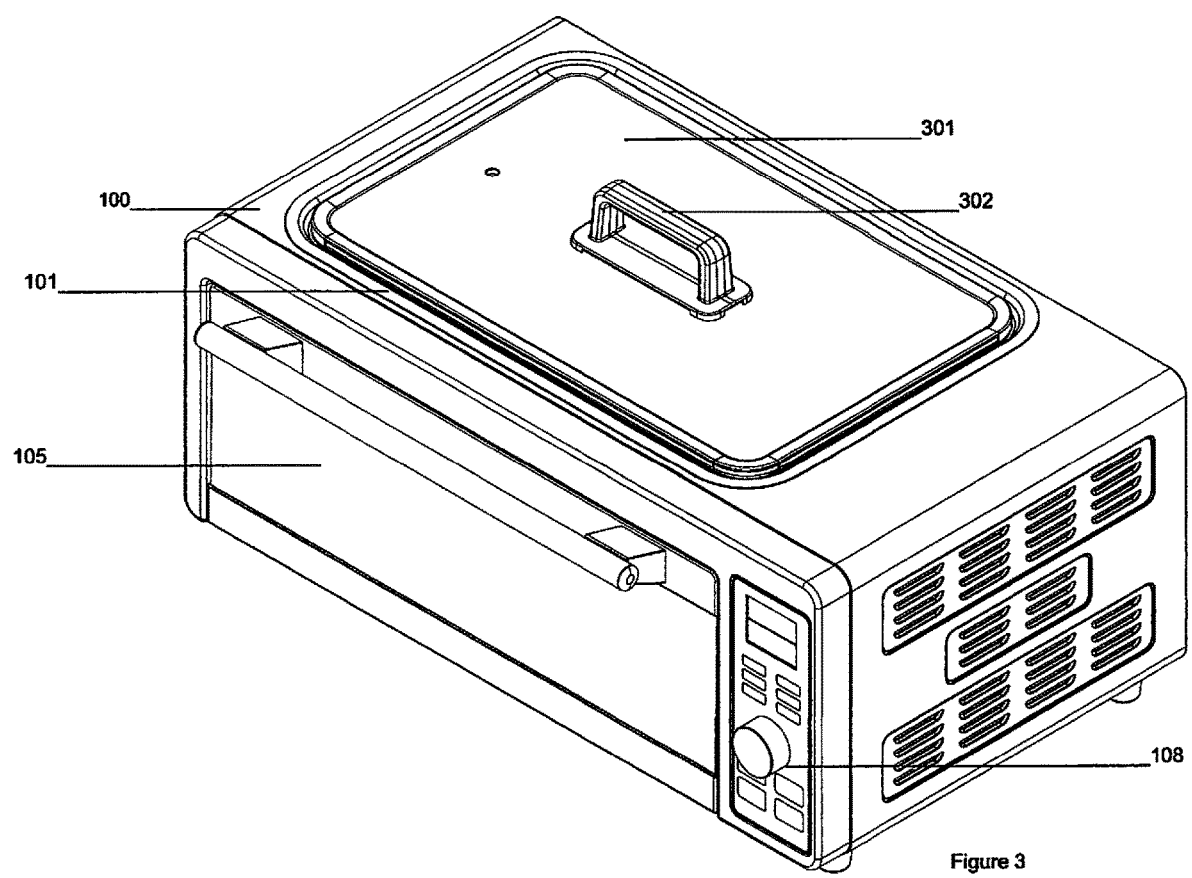
FIG. 3 is a perspective view of one embodiment of a two-tier grill with a lid and a closed door.

FIG. 3 is a perspective view of one embodiment of a two-tier grill 100 with a lid 301 and a closed door 105, in accordance with certain examples of the technology disclosed herein. The two-tier grill 100 is illustrated with at least the grilling chamber 101 enclosed under a lid 301, the closed door 105 to the air fryer chamber 102, and the control panel 108. With the closed door 105, the temperature inside the air fryer chamber 102 is able to be heated to a desired temperature to air fry the food products inside or cook the food products in another manner, such as baking. The circulated heated air is further contained inside the two-tier grill 100 when the door is closed.

With the lid 301 on the grilling chamber 101, a user can retain heat and smoke while heating food items on the grilling plate 103. The lid 301 is illustrated with a handle 302 for raising or lowering the lid 301. The handle 302 allows the lid 301 to be installed or removed while the lid 301 is hot. The lid 302 creates a substantially sealed environment in the grilling chamber 101 such that smoke may be drawn out of the grilling chamber 101 by the fan through vents in the sidewall 107.

Figure 4:
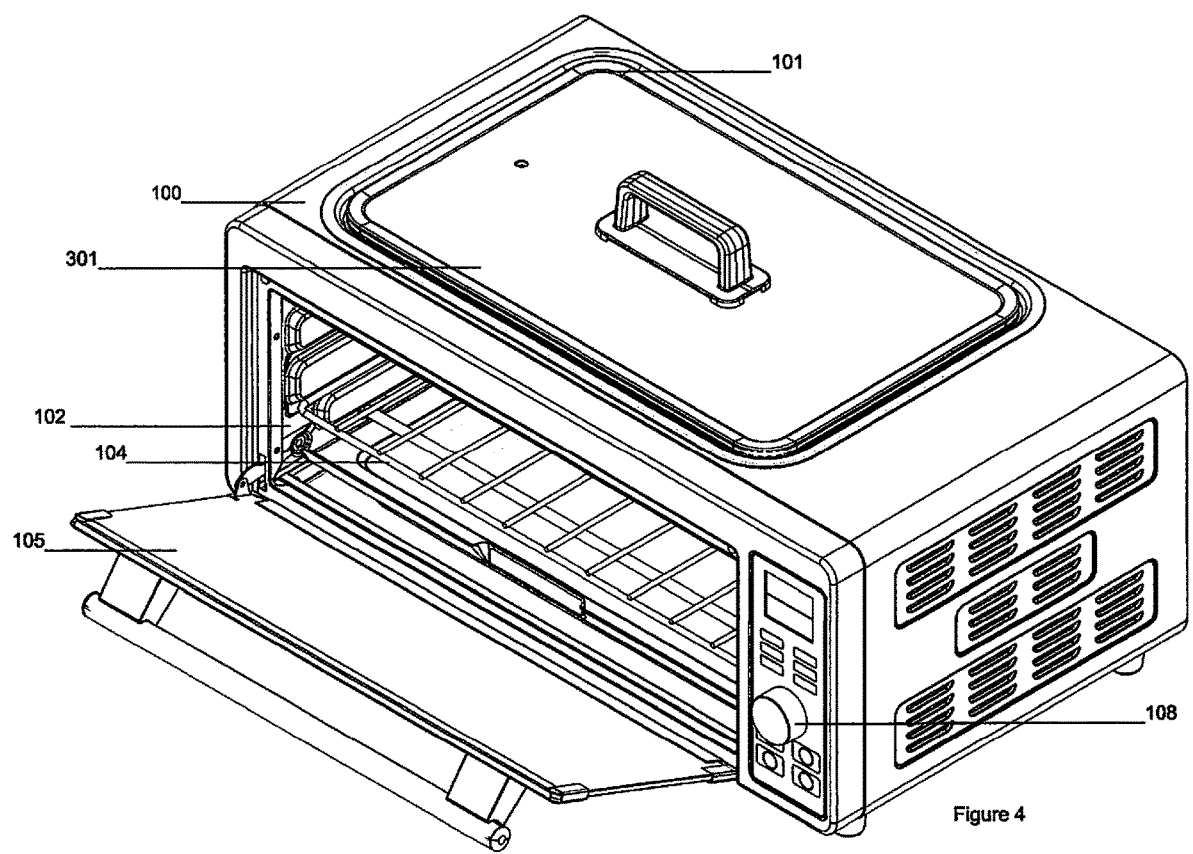
FIG. 4 is a perspective view of one embodiment of a two-tier grill with a lid and an opened door.

FIG. 4 is a perspective view of one embodiment of a two-tier grill 100 with a lid 301 and an opened door 105, in accordance with certain examples of the technology disclosed herein. The two-tier grill 100 is illustrated with at least the grilling chamber 101 enclosed under a lid 301, the opened door 105 to the air fryer chamber 102, the rack 104, and the control panel 108. With the opened door 105, a user is able to place food items and/or cooking accessories into the air frying chamber 102 for cooking.

FIG. 5 is a cutaway perspective view of one embodiment of a two-tier grill 100 with a lid 301 and a closed door 105, in accordance with certain examples of the technology disclosed herein. The two-tier grill 100 is illustrated with at least the grilling chamber 101 enclosed under a lid 301, the closed door 105 to the air fryer chamber 102, upper heating elements 501, inlet vents 502, a fan 503, and lower heating element 106. With the closed door 105, the temperature inside the air fryer chamber 102 is able to be heated to a desired temperature to air fry the food products inside. The circulated heated air is further contained inside the two-tier grill 100 when the door is closed.

With the lid 301 on the grilling chamber 101, a user can retain heat and smoke while heating food items on the grilling plate 103. The lid 301 creates a substantially sealed environment in the grilling chamber 101 such that smoke may be drawn out of the grilling chamber 101 by the fan through inlet vents 502 in the sidewall of the grilling chamber 101.

The upper elements 501 are illustrated as being below the grilling plate 103 and at the top of the air frying chamber 102. The upper element 501 simultaneously heats both the grilling plate 103 and the air frying chamber 102. The upper element 501 and the lower element 106 may operate in conjunction with one another or independently. For example, the control panel 108 may be configured to provide electrical power or other control signal to upper element 501 and the lower element 106, either the upper element 501 or the lower element 106, or even just a portion of each of the upper element 501 and/or the lower element 106. That is, each of the upper element 501 and the lower element 106 may be composed of one element each or multiple elements each. For example, the upper element 501 may have two or more separate heating elements that are controlled together or independently. For example, if desired, a lower heating temperature may be maintained by operating less than all of the upper elements 501 at the same time.

The fan 503 is illustrated outside of the air fryer chamber 102 and in the interior of the two-tier grill 100 itself. The fan 503 is powered by an electrical motor and controlled by the control panel 108. The fan 503 may have multiple speed settings based on the type of cooking being performed or the temperature being maintained. For example, when air frying food products, the fan 503 may operate at a higher speed to provide greater air flow over the food products. When only grilling in the grilling chamber 101, a lower fan setting may be used. When baking in the air fryer chamber 102, the fan may be set to a lowest setting or completely disabled. The user may set the speed of the fan 503 manually via the control panel 108, or the speed of the fan 503 may be set by a program in the control panel 108.

The fan 503 may draw air and/or smoke from the grilling chamber 101 via the inlet vents 502 and through a duct or channel from the inlet vents 502 to the fan inlet. The inlet vents 502 may be a series of slits or vents. The inlet vents 502 allow smoke and air from the grilling chamber 101 to be removed from the cooking environment and directed along a channel 504 to a mechanism for removing the smoke. Any other size and shape of inlet vents 502 may be used, such as a single orifice, a series of round holes, a single rectangular slit, or any other suitable opening that allows the air and smoke to be drawn from the cooking environment. The channel 504 may be any sealed pathway for the smoke and/or air to be drawn from the inlet vents 502 to the fan 503 inlet. The channel 504 prevents the hot air or smoke from getting into the body of the two-tier grill 100 outside of the cooking area or fan blade compartment. That is, the electronics, the control panel 108, the power supply, or any other components are protected from the hot air or smoke. Further, the outside perimeter of the two-tier grill 100 is not sealed to prevent the hot air or smoke from escaping to the environment. Any cooking chamber, fan housing, or channel 504 are substantially sealed to prevent air from escaping.

Figure 18:
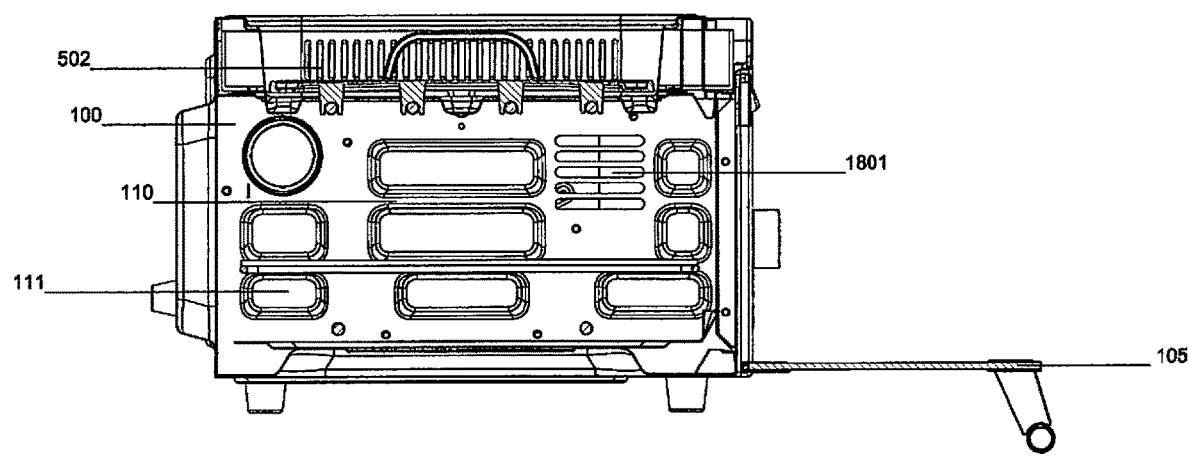
FIG. 18 is a cutaway side view of one embodiment of a two-tier grill with an closed door.

The fan 503 forces air through outlet vents 1801 (as depicted and described in FIG. 18). The outlet vents 1801 allow the air forced by the fan to be circulated to the air fryer chamber 102. The air travels through the outlet vents 1801 and into the air fryer chamber 102 and is circulated throughout the body of the air fryer chamber 102. The air is heated by the upper elements 501 and/or the lower elements 106 while in the body of the air fryer chamber 102. The heated, circulating air is drawn up to the grilling chamber 101 by the vacuum created by the fan 503 inlet. That is, the fan 503 inlet draws air out of the grilling chamber 101 as described herein, and this causes air to be similarly drawn into the grilling chamber 101 from the air fryer chamber 102. The air passes up into the grilling chamber 101 via the holes in the grilling plate 103 or around the sides of the grilling plate 103. The air drawn into the grilling chamber 101 is thus already heated from the air fryer chamber 102 and is further heated by the heating of the grilling plate 103 by the upper element 501.

The recirculating of the air from the grilling chamber 101 to the fan 503, from the fan 503 to the air fryer chamber 102, and from the air fryer chamber 102 back to the grilling chamber 101, allows the heat to be retained and reused. The smoke is contained in the system and is optionally removed by the filter 1201 (as depicted and described in FIG. 12).

Figure 6:
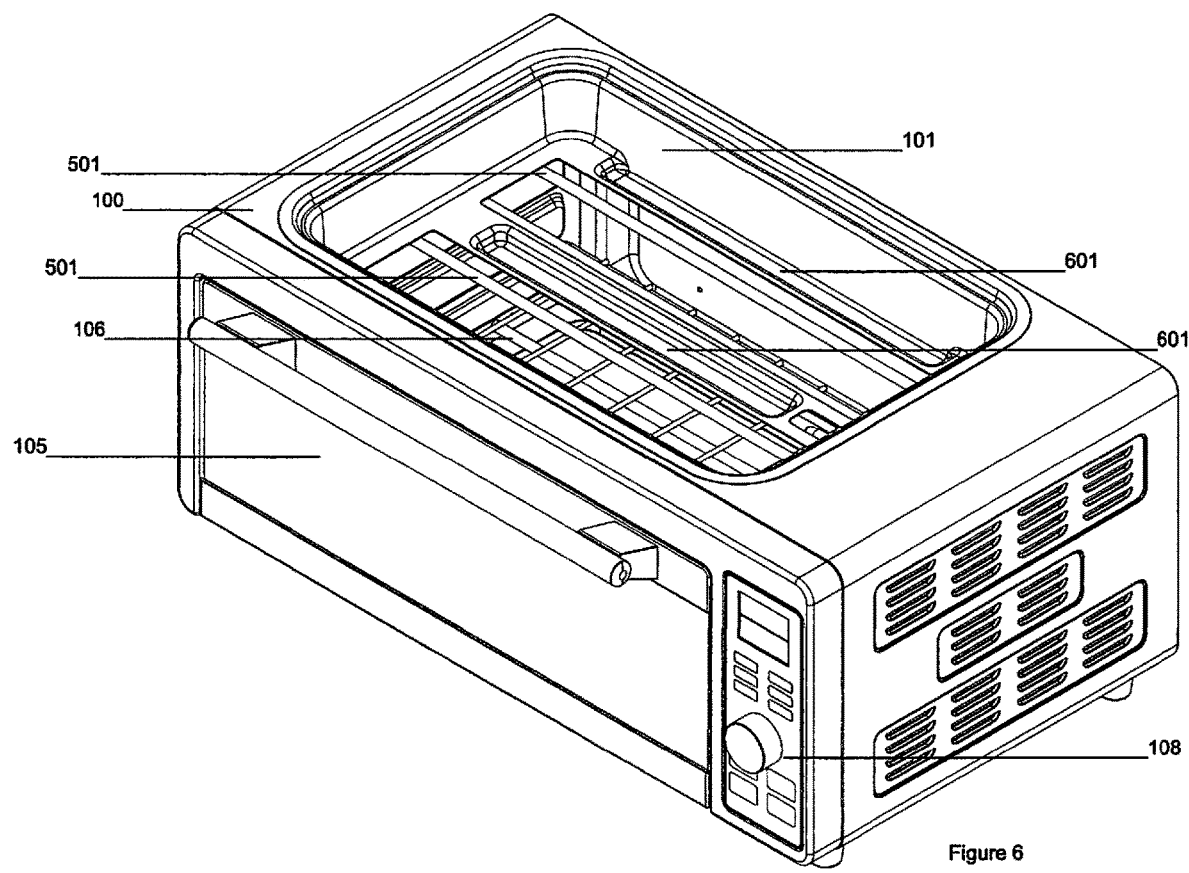
FIG. 6 is a perspective view of one embodiment of a two-tier grill with a closed door and the grilling plate removed.

FIG. 6 is a perspective view of one embodiment of a two-tier grill 100 with a closed door 105 and the grilling plate 103 removed, in accordance with certain examples of the technology disclosed herein. The two-tier grill 100 is illustrated with at least the grilling chamber 101 open without the lid 301, the closed door 105 to the air fryer chamber 102, upper heating elements 501, lower heating elements 106, grease channels 601, and the control panel 108. When the grilling plate 103 is installed in the grilling chamber 101, the upper elements 501 are either contacting or adjacent to the grilling plate 103. When power is provided to the upper elements 501, the heat is transferred to the grilling plate 103 to heat the grilling plate 103 and any food items on the grilling plate 103. The grilling chamber 101 is depicted in FIG. 6 without the grilling plate 103 such that the grease channel 601 and the upper element 501 are viewable. The grilling plate 103 may be removed for cleaning, maintenance, or for any suitable reason.

The two-tier grill 100 includes a grease holding reservoir. In examples, the two-tier grill 100 includes a grease channel 601 to drain the grease or other liquids from the food and to a holding reservoir. The grease channel 601 receives grease or other fluids that drain from the food products and through any holes in the grilling plate 103. The holding reservoir may collect and store the grease or other liquids until a user empties the holding reservoir. In an example, the holding reservoir may be removed from the indoor grill so that the grease may be discarded. In addition to reducing the fat and calories in the food items, removing the grease from the cooking surface of the two-tier grill 100 reduces the smoke created by the upper element 501 and the lower element 106. Heated grease creates more smoke and removing a portion of the grease reduces the smoke created.

Figure 7:
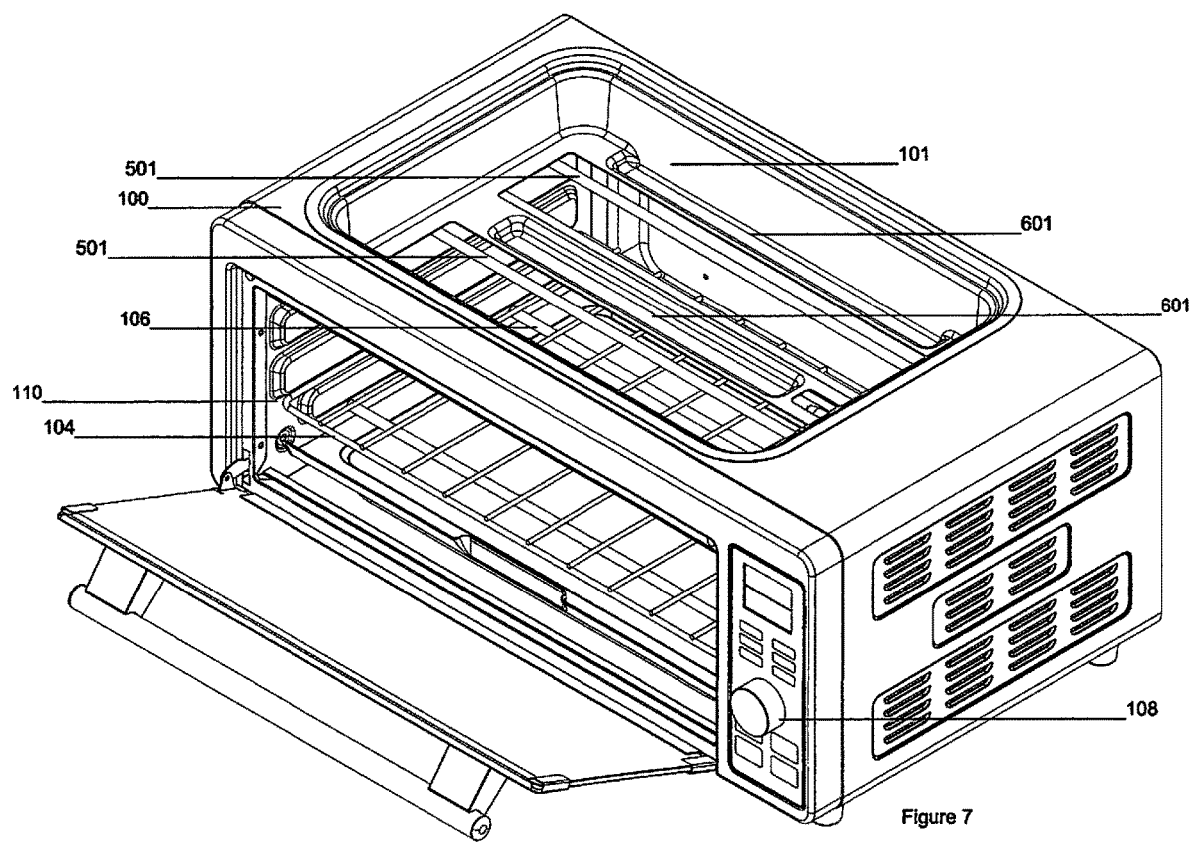
FIG. 7 is a perspective view of one embodiment of a two-tier grill with an open door and the grilling plate removed.

FIG. 7 is a perspective view of one embodiment of a two-tier grill 100 with an open door 105 and the grilling plate 103 removed, in accordance with certain examples of the technology disclosed herein. The two-tier grill 100 is illustrated with at least the grilling chamber 101 open without the lid 301, the open door 105 to the air fryer chamber 102, upper heating elements 501, lower heating elements 106, grease channels 601, a wire rack 104 in a groove 110, and the control panel 108. When the grilling plate 103 is installed in the grilling chamber 101, the upper elements 501 are either contacting or adjacent to the grilling plate 103.

Figure 8:
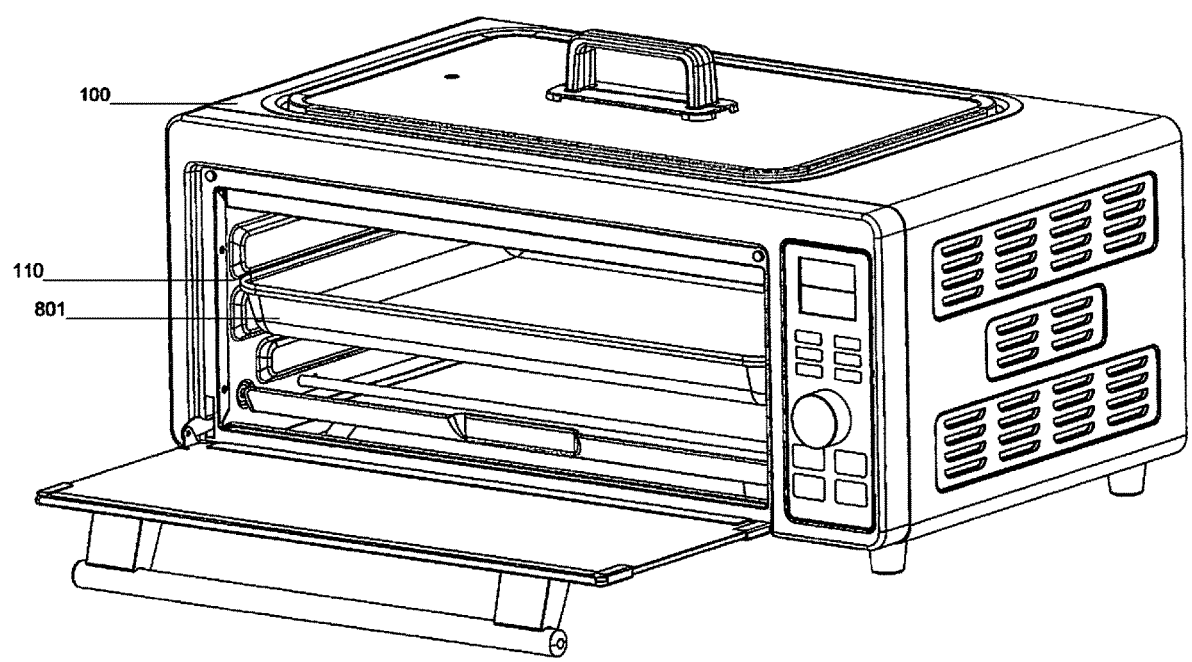
FIG. 8 is a perspective view of one embodiment of a two-tier grill with an open door and a crisper basket.

FIG. 8 is a perspective view of one embodiment of a two-tier grill 100 with an open door 105 and a crisper basket 801, in accordance with certain examples of the technology disclosed herein. The two-tier grill 100 is illustrated with at least the grilling chamber 101 closed with the lid 301, the opened door 105 to the air fryer chamber 102, and the crisper basket 801 installed in the grooves 110. The crisper basket 801 may be any type of basket, pan, bowl, or container that is suitable for air frying food products. In an example, the crisper basket 801 is a wire mesh basket that allows the heated circulated air to flow over and around the food items to create greater contact between the air and the food products. The heated air flowing over the surface of the food product creates an air frying effect that makes food crispier and simulates conventional oil frying.

The crisper basket 801 is installed in the illustration in the grooves 110 created in the wall of the air frying chamber 102. Alternatively, the crisper basket 801 may be placed on the rack 104 or in any other suitable manner supported in the air fryer chamber 102. In the example, the crisper basket 801 is installed in the center portion of the air fryer chamber 102. By placing the crisper basket 801 in the center, the air flow is more evenly distributed across the surface of the food products in the crisper basket 801, which more evenly air fries the food product.

Figure 9:
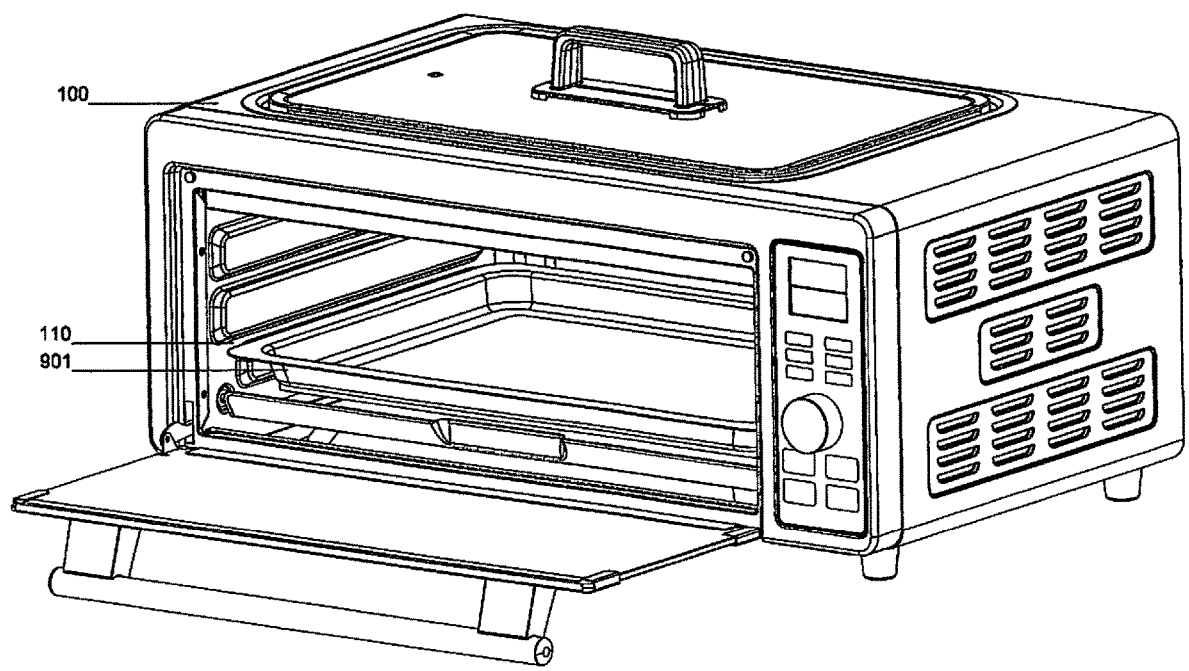
FIG. 9 is a perspective view of one embodiment of a two-tier grill with an open door and a baking pan.

FIG. 9 is a perspective view of one embodiment of a two-tier grill 100 with an open door 105 and a baking pan 901, in accordance with certain examples of the technology disclosed herein. The two-tier grill 100 is illustrated with at least the grilling chamber 101 closed with the lid 301, the opened door 105 to the air fryer chamber 102, and the baking pan 901 installed. The baking pan 901 may be any type of basket, pan, bowl, or container that is suitable for baking food products. In an example, the baking pan 901 is a flat pan with upturned edges that allows food products to be heated from the surrounding air and from the heated pan itself. The baking pan 901 is heated from the lower heating element 106 below the pan and by the air in the air fryer chamber 102.

The baking pan 901 is installed in the illustration on support members of the body of the air fryer chamber 102. Alternatively, the baking pan 901 may be installed in the grooves 110 created in the wall of the air fryer chamber 102. Alternatively, the baking pan 901 may be placed on the rack 104 or in any other suitable manner supported in the air fryer chamber 102. In the example, the baking pan 901 is installed near the bottom portion of the air fryer chamber 102. By placing the baking pan 901 in the bottom, the baking pan 901 is heated directly from the lower element 106 and the air is heated by the upper heating element 501 (not shown). Food products are baked by cooking the food products with dry heat and without exposure to a flame, such as in an oven. With a lower fan speed, or without a fan at all, food products in the air fryer chamber 102 are baked instead of air fried.

Figure 10:
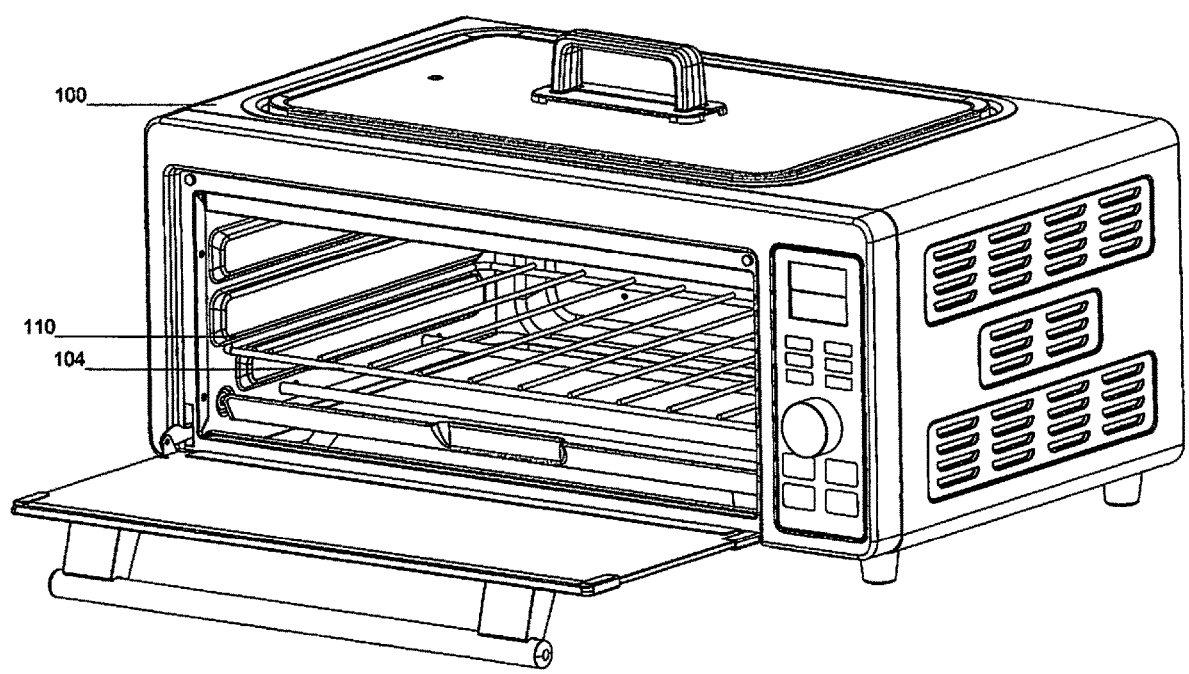
FIG. 10 is a perspective view of one embodiment of a two-tier grill with an open door and a rack.

FIG. 10 is a perspective view of one embodiment of a two-tier grill 100 with an open door 105 and a rack 104, in accordance with certain examples of the technology disclosed herein. The two-tier grill 100 is illustrated with at least the grilling chamber 101 closed with the lid 301, the opened door 105 to the air fryer chamber 102, and the rack 104 installed in the grooves 110. The rack 104 may be any type of wire rack, lattice, perforated plate, grid, or any other type of rack 104 that is suitable for supporting food products or pans. The items on the rack 104 are heated from the lower heating element 106 below the rack 104, the upper heating elements 501, and the heated air.

The rack 104 is installed in the illustration in the grooves 110 created in the wall of the air frying chamber 102. Alternatively, the rack 104 may be supported on support members of the body of the air fryer chamber 102. In the example, the rack 104 is installed in the bottom portion of the air fryer chamber 102.

Figure 11:
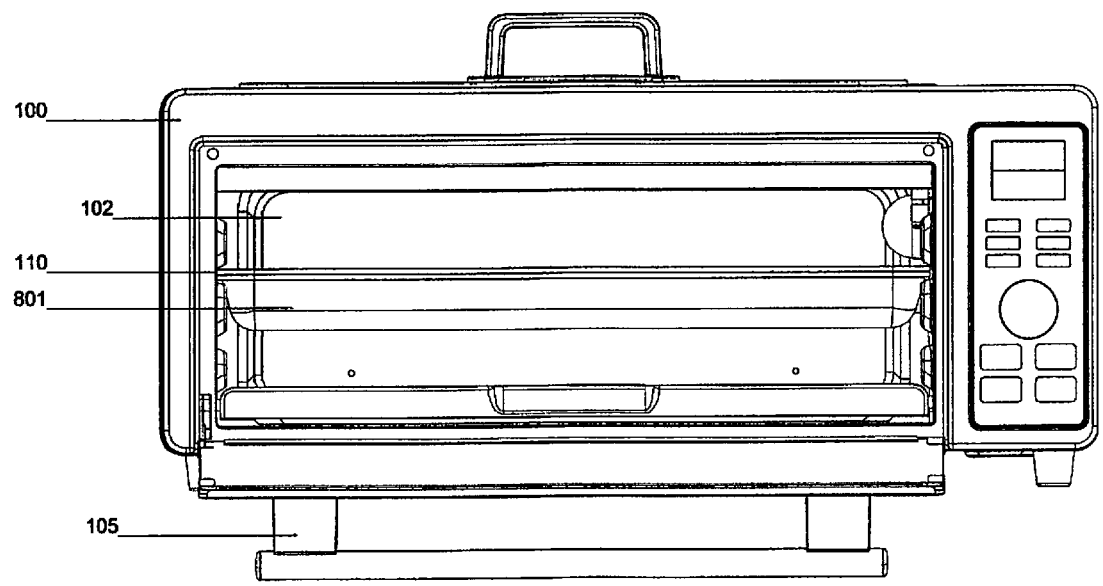
FIG. 11 is a front view of one embodiment of a two-tier grill with an open door and a crisper basket.

FIG. 11 is a front view of one embodiment of a two-tier grill 100 with an open door 105 and a crisper basket 801, in accordance with certain examples of the technology disclosed herein. The two-tier grill 100 is illustrated with at least the grilling chamber 101 closed with the lid 301, the opened door 105 to the air fryer chamber 102, and the crisper basket 801 installed in the grooves 110. The crisper basket 801 may be any type of basket, pan, bowl, or container that is suitable for air frying food products. In an example, the crisper basket 801 is a wire mesh basket that allows the heated circulated air to flow over and around the food items to create greater contact between the air and the food products. The heated air flowing over the surface of the food product creates an air frying effect that makes food crispier and simulates conventional oil frying.

The crisper basket 801 is installed in the illustration in the grooves 110 created in the wall of the air frying chamber 102. Alternatively, the crisper basket 801 may be placed on the rack 104 or in any other suitable manner supported in the air fryer chamber 102. In the example, the crisper basket 801 is installed in the center portion of the air fryer chamber 102. By placing the crisper basket 801 in the center, the air flow is more evenly distributed across the surface of the food products in the crisper basket 801.

Figure 12:
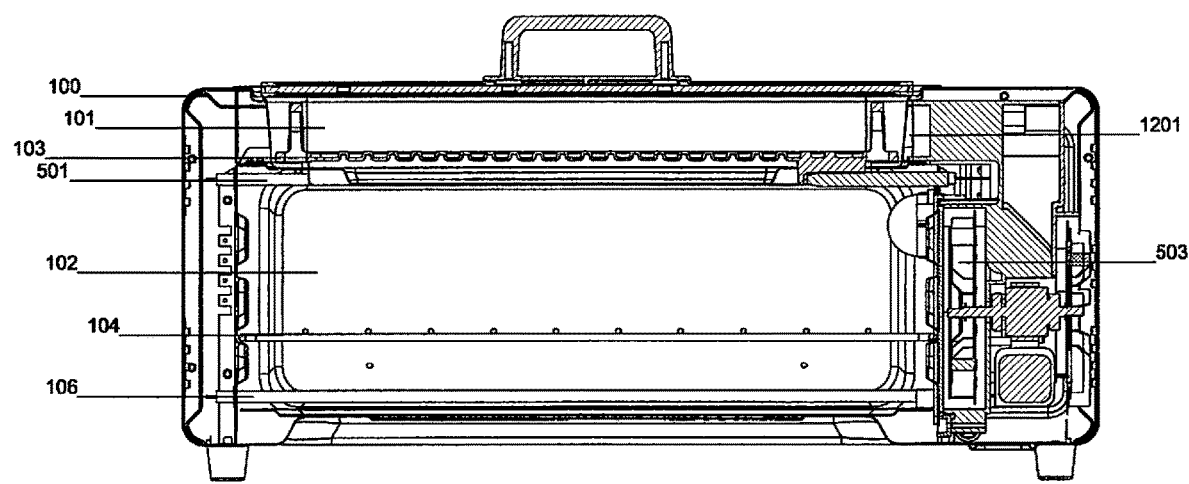
FIG. 12 is a cutaway view of one embodiment of a two-tier grill with a lid.

FIG. 12 is a cutaway front view of one embodiment of a two-tier grill 100 with a lid 301, in accordance with certain examples of the technology disclosed herein. In the illustration, the front of the two-tier grill 100 is cutaway displaying the center and rear portion of the two-tier grill 100. The two-tier grill 100 is illustrated with at least the grilling chamber 101 and grilling plate 103 enclosed under a lid 301, the air fryer chamber 102, upper heating elements 501, lower heating elements 106, a fan 503, the rack 104, a filter 1201, and the control panel 108.

Upper heating element 501 is illustrated as being below the grilling plate 103 and at the top of the air frying chamber 102. The upper element 501 simultaneously heats both the grilling plate 103 and the air frying chamber 102. The lower element 106 is below the rack 104 at the bottom of the air frying chamber 102. The fan 503 is illustrated outside of the air fryer chamber 102 and in the interior of the two-tier grill 100 itself. The upper element 501 and the lower element 106 may be operated jointly or separately based on the temperate requirements or the type of cooking being performed. For example, if only the user is only using the grilling chamber 101 and not the air fryer chamber 102, then the control panel 108 may only engage the upper element 501 and not the lower element 106.

The filter 1201 is illustrated on the downstream side of the inlet vents 502. The filter 1201 removes smoke and other particulates from the air drawn out of the grilling chamber 101. The filtered air is drawn to the inlet of the fan 503. The filter may be constructed of any suitable material, such as a plastic, cellulose, metal, or other suitable material.

Figure 13:
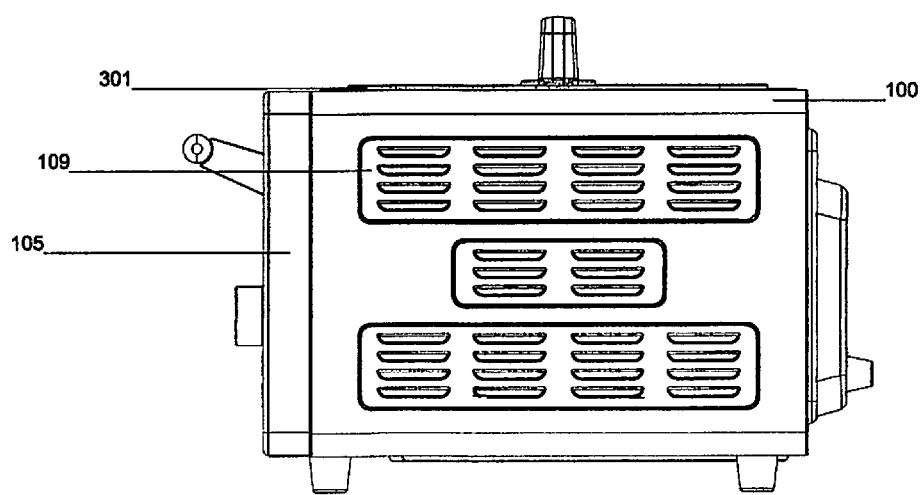
FIG. 13 is a side view of one embodiment of a two-tier grill with a lid and a closed door.

FIG. 13 is a side view of one embodiment of a two-tier grill 100 with a lid 301 and a closed door 105, in accordance with certain examples of the technology disclosed herein. The two-tier grill 100 is illustrated with at least the grilling chamber 101 enclosed under a lid 301, and the closed door 105 to the air fryer chamber 102. The two-tier grill 100 is illustrated with environmental vents 109 for maintaining the temperature of the body of the two-tier grill 100.

Figure 14:
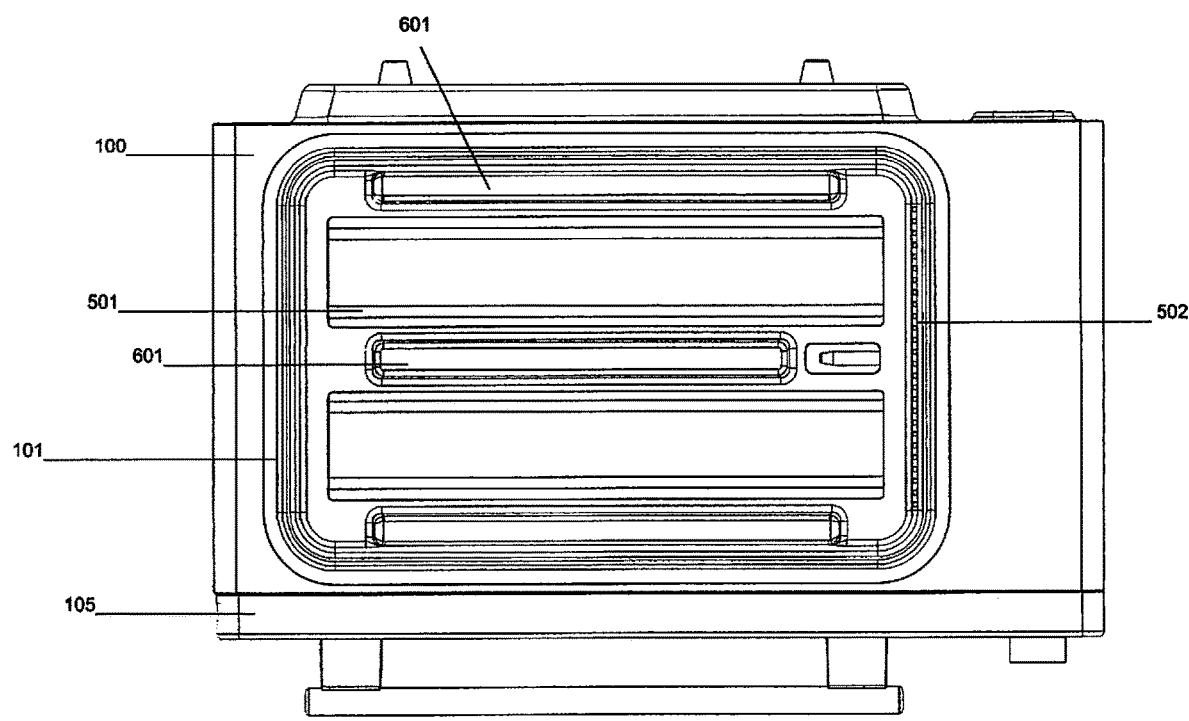
FIG. 14 is a top view of one embodiment of a two-tier grill with a closed door and the grilling plate removed.

FIG. 14 is a top view of one embodiment of a two-tier grill 100 with a closed door 105 and the grilling plate 103 removed, in accordance with certain examples of the technology disclosed herein. The two-tier grill 100 is illustrated with at least the grilling chamber 101 open without the lid 301, the closed door 105 to the air fryer chamber 102, upper heating elements 501, grease channels 601, and the inlet vents 502. When the grilling plate 103 is installed in the grilling chamber 101, the upper elements 501 are either contacting or adjacent to the grilling plate 103. When power is provided to the upper elements 501, the heat is transferred to the grilling plate 103 to heat the grilling plate 103 and any food items on the grilling plate 103.

Figure 15:
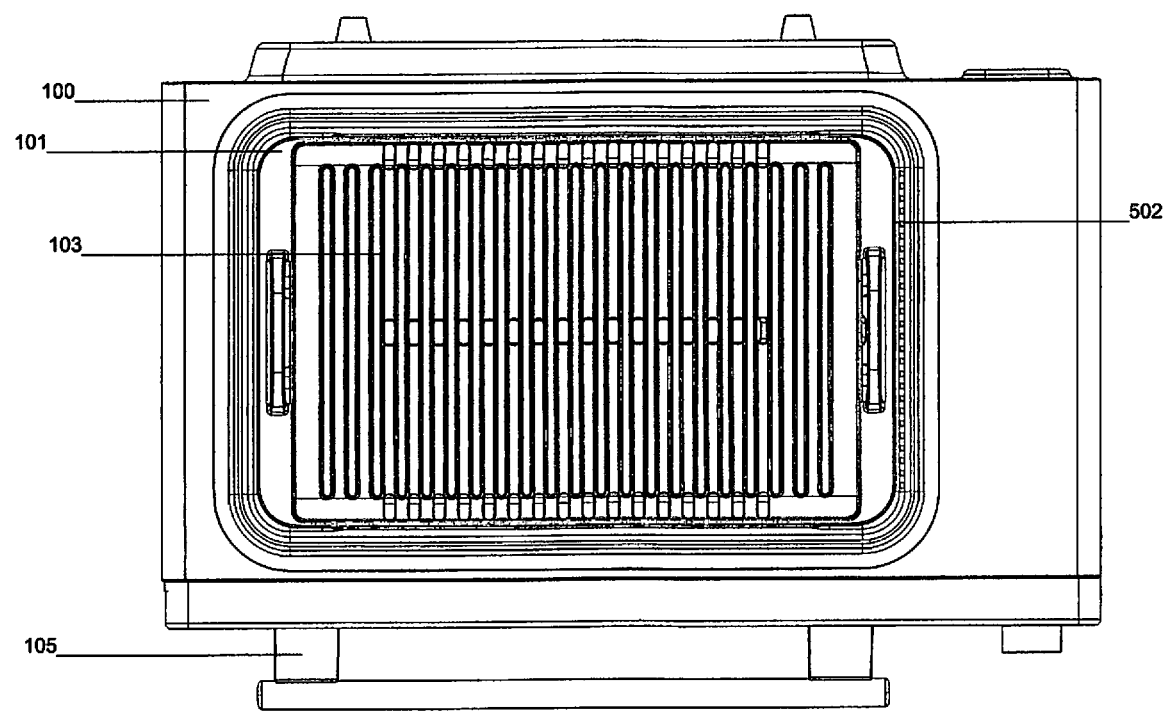
FIG. 15 is a top view of one embodiment of a two-tier grill with a closed door and the grilling plate.

FIG. 15 is a top view of one embodiment of a two-tier grill 100 with a closed door 105 and the grilling plate 103, in accordance with certain examples of the technology disclosed herein. The two-tier grill 100 is illustrated with at least the grilling chamber 101 open without the lid 301, the closed door 105 to the air fryer chamber 102, the grilling plate 103, and the inlet vents 502.

Figure 16:
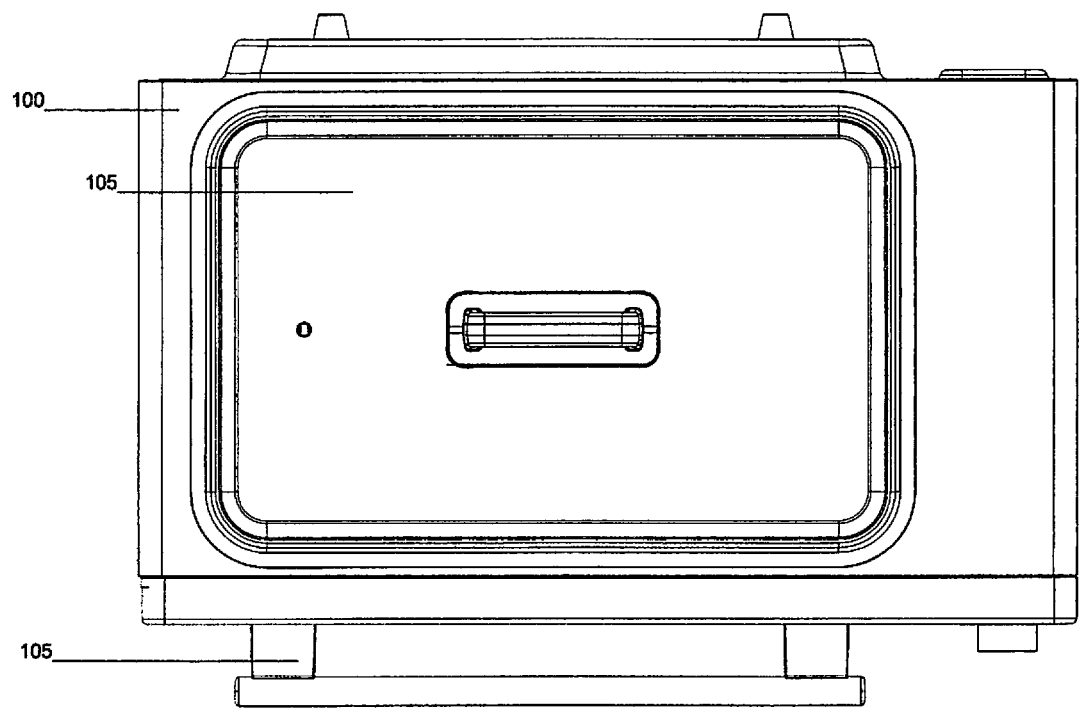
FIG. 16 is a top view of one embodiment of a two-tier grill with a closed door and the lid on the grilling chamber.

FIG. 16 is a top view of one embodiment of a two-tier grill 100 with a closed door 105 and the lid 301 on the grilling chamber 101, in accordance with certain examples of the technology disclosed herein. The two-tier grill 100 is illustrated with at least the grilling chamber 101 covered without the lid 301, and the closed door 105 to the air fryer chamber 102.

Figure 17:
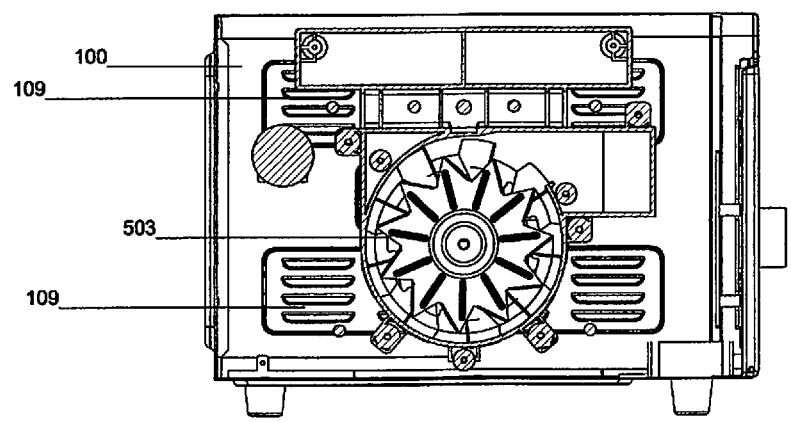
FIG. 17 is a cutaway side view of one embodiment of a two-tier grill with a closed door.

FIG. 17 is a cutaway side view of one embodiment of a two-tier grill 100 with a closed door 105, in accordance with certain examples of the technology disclosed herein. In the illustration, the side of the two-tier grill 100 is cutaway displaying the side portion of the two-tier grill 100. The two-tier grill 100 is illustrated with at least the fan 503, and the environmental vents 109. The fan 503 is illustrated outside of the air fryer chamber 102 and in the interior of the two-tier grill 100 itself.

FIG. 18 is a cutaway side view of one embodiment of a two-tier grill 100 with an open door 105, in accordance with certain examples of the technology disclosed herein. In the illustration, the side of the two-tier grill 100 is cutaway displaying the side portion of the two-tier grill 100. The two-tier grill 100 is illustrated with at least the grooves 110, the protrusions 111, and the inlet vents 502. The fan 503 forces air into the air fryer chamber 102 via the fan outlet vents 1801. The outlet vents 1801 are illustrated as a series of slits or vents. Any other size and shape of outlet vents 1801 may be used, such as a single orifice, a series of round holes, a single rectangular slit, a series of slits, or any other suitable opening that allows the air and smoke to be drawn from the cooking environment. Any number of outlet vents 1801 may be used such as 1, 2, 4, or 8. The outlet vents 1801 are located on the wall of the air fryer chamber 102. In an example, behind the wall with the outlet vents 1801 is the fan 503.

Figure 19:
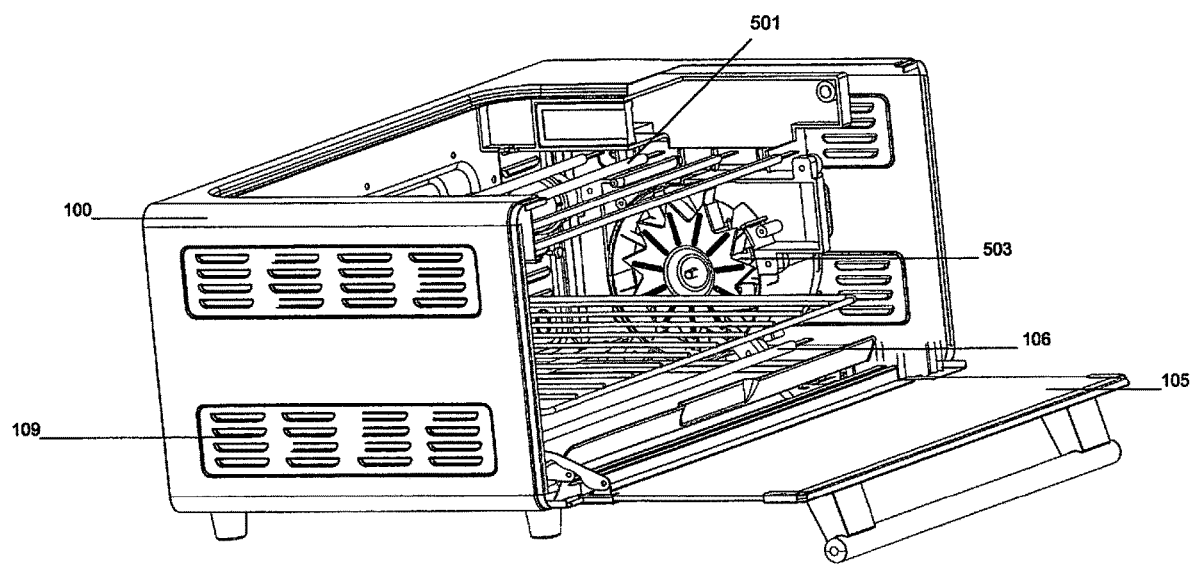
FIG. 19 is a cutaway perspective view of one embodiment of a two-tier grill with an opened door.

FIG. 19 is a cutaway perspective view of one embodiment of a two-tier grill 100 with an opened door 105, in accordance with certain examples of the technology disclosed herein. In the illustration, the front and top of the two-tier grill 100 is cutaway displaying the inner portion of the two-tier grill 100. The two-tier grill 100 is illustrated with at least the fan 503, the environmental vents 109, the upper element 501, and the lower element 106.

Figure 20:
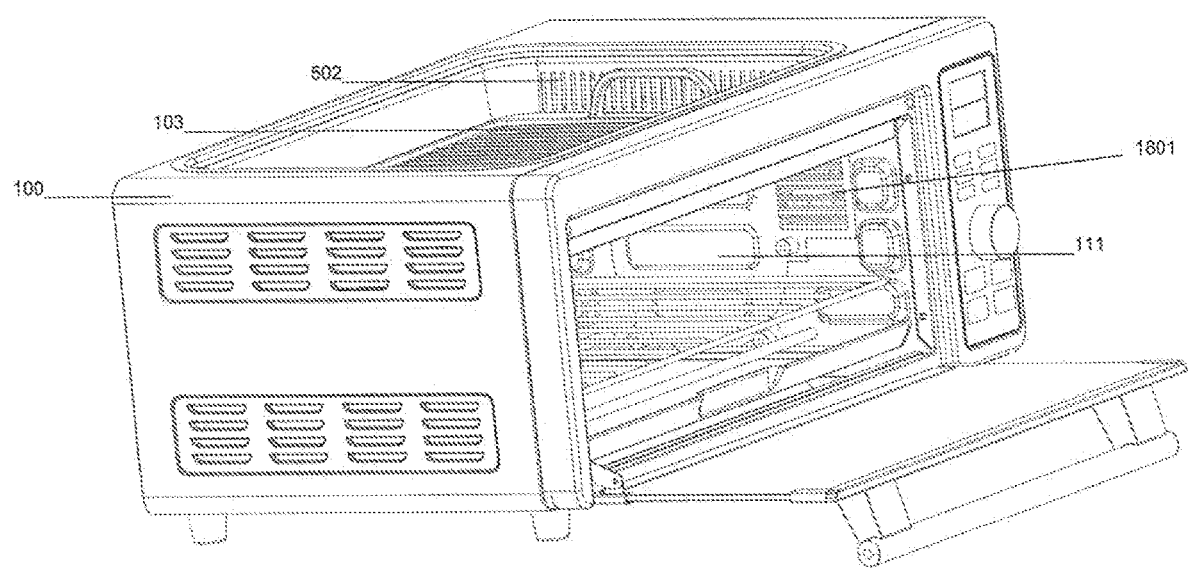
FIG. 20 is a perspective view of one embodiment of a two-tier grill with a lid removed and a door open.

FIG. 20 is a perspective view of one embodiment of a two-tier grill 100 with a lid removed and a door 105 open, in accordance with certain examples of the technology disclosed herein. The two-tier grill 100 is illustrated with at least a grilling plate 103, protrusions 111, inlet vents 502, and the outlet vents 1801. The fan 503, located behind the sidewall of the air fryer chamber 102 forces air through the outlet vents 1801 and into the air fryer chamber 102.

In an example method of using the two-tier grill 100, a user may desire to grill food items on the grilling plate 103 in the grilling chamber 101 and simultaneously or alternatively air fry foods in the air fryer chamber 102. The user would open the lid 301 of the grilling chamber 101 and place food items on the grilling plate 103. The user would open the door 105 of the air fryer chamber 102 and place food items in a crisper basket 801 that is placed in the grooves 110. The grooves 110 support the crisper basket 801 in substantially the center of the air fryer chamber 102 such that the hot circulated air passes over the food products in all directions.

The user would engage the control panel 108 such as by pressing buttons, turning knobs, inputting data, or in any other manner instructing the control panel 108 to engage one or both of the grilling chamber 101 and the air fryer chamber 102. In the example, the user may engage both the grilling chamber 101 and the air fryer chamber 102 at the same time or operate either individually. The user may enter a preset recipe function in the control panel 108, enter individual times and temperatures for each of the grilling chamber 101 and the air fryer chamber 102, or enter individual functions, such as a grilling function and/or an air frying function.

The control panel 108 engages one or more of the upper elements 501, lower elements 106 and the fan 503. In the example, the upper elements 501 heat the air in the air fryer chamber 102. Simultaneously, the upper elements 501 heat the grilling plate 103 and the grilling chamber 101. The fan 503 draws air from the grilling chamber 101 into the inlet of the fan 503. Any smoke in the air is filtered, precipitated, or otherwise removed from the air and the air is forced by the fan back into the air fryer chamber 102.

The fan 503 may change speeds based on the recipe or other options selected. For example, if the user is baking a food item in a baking pan 901 to bake a food product, the fan 503 may operate at a lower speed to provide a lower air flow over the food products. Different types of cooking use different air flow speeds. For example, air frying requires a higher air flow speed.

The user may remove the grilling plate 103 from the two-tier grill 100 for cleaning. In an example, the grilling plate 103 clips to the body of the two-tier grill 100 via clips, latches or other fastener. In another example, the grilling plate 103 is held in place via gravity and/or friction. The user may take the lid 301 off the two-tier grill 100 and manually remove the grilling plate 103.

What is claimed is:

1. A multi-chamber cooking apparatus, comprising:
an apparatus body comprising a first cooking chamber and a second cooking chamber;
at least one heating element controlled by the apparatus, wherein the at least one heating element is positioned between the first cooking chamber and the second cooking chamber so as to be able to generate heat within both the first and second cooking chambers for cooking food as can be provided within one or both of the first and second cooking chambers; and
a fan operatively positioned in fluid communication between the first and second cooking chambers, wherein air from the first cooking chamber is drawn to an inlet to the fan and an outlet of the fan is directed to the second cooking chamber.

2. The apparatus of claim 1, wherein the at least one heating element heats the first cooking chamber and the second cooking chamber simultaneously.

3. The apparatus of claim 1, wherein the second cooking chamber includes an air frying crisper basket in which food products are air fried by heated air circulated in the second cooking chamber by the fan.

4. The apparatus of claim 1, wherein the first cooking chamber includes a grilling plate that grills food products.

5. The apparatus of claim 4, wherein when a lid is placed on the first cooking chamber, a first cooking chamber cooking environment is substantially sealed such that the air leaves the first cooking chamber environment primarily via vent inlet holes when drawn by the fan.

6. The apparatus of claim 4, wherein the at least one heating element is in contact with the grilling plate in the first cooking chamber.

7. The apparatus of claim 4, wherein heated circulated air from the second cooking chamber is drawn by the fan into the first cooking chamber via holes in the grilling plate.

8. The apparatus of claim 4, wherein the grilling plate heated elements have an uneven surface to create score marks in the food items.

9. The apparatus of claim 1, wherein the at least one heating element is a resistive heating coil.

10. The apparatus of claim 4, wherein a lower portion of the grilling plate comprises holes to allow liquids to flow from the lower portion of the grilling plate.

11. The apparatus of claim 9, further comprising a liquid reservoir to collect the liquids that flow from the lower portion of the grilling plate.

12. The apparatus of claim 1, further comprising a filter to remove smoke from the air.

13. The apparatus of claim 12, wherein the filter is located between the first cooking chamber and the fan.

14. The apparatus of claim 1, wherein the second cooking chamber includes a baking pan for baking food products.

15. The apparatus of claim 1, wherein the fan and the at least one heating element is controlled by a control panel with a user interface that receives user inputs.

16. The apparatus of claim 1, wherein the first and second cooking chambers are independently accessible, the first cooking chamber by way of a first closure element and the second cooking chamber by way of a second closure element, so that cooking can be done in either of the first and second cooking chambers or in both the of the first and second cooking chambers at the same time.

17. A multi-chamber cooking apparatus, comprising:

an apparatus body comprising a first cooking chamber and a second cooking chamber;

at least one heating element controlled by the apparatus, wherein the at least one heating element is positioned between the first cooking chamber and the second cooking chamber so as to be able to generate heat within both the first and second cooking chambers; and a fan operatively positioned in fluid communication between the first and second cooking chambers, wherein air from the first cooking chamber is drawn to an inlet to the fan and an outlet of the fan is directed to the second cooking chamber, and further wherein second cooking chamber includes an air frying crisper basket in which food products are air fried by heated air circulated in the second cooking chamber by the fan.

18. A multi-chamber cooking apparatus, comprising:

an apparatus body comprising a first cooking chamber and a second cooking chamber;

at least one heating element controlled by the apparatus, wherein the at least one heating element is positioned between the first cooking chamber and the second cooking chamber so as to be able to generate heat within both the first and second cooking chambers; and a fan operatively positioned in fluid communication between the first and second cooking chambers, wherein air from the first cooking chamber is drawn to an inlet to the fan and an outlet of the fan is directed to the second cooking chamber, and further wherein the second cooking chamber includes a baking pan for baking food products.

* * * * *